(12) United States Patent
Bauduin et al.

(10) Patent No.: US 10,598,044 B2
(45) Date of Patent: Mar. 24, 2020

(54) OIL JET FOR TURBINE ENGINE WITH HOUSING INCLUDING SEALING MEMBRANE

(71) Applicant: Safran Transmission Systems, Colombes (FR)

(72) Inventors: Lionel Bauduin, Moissy-Cramayel (FR); Maxence Guillemont, Moissy-Cramayel (FR); Julien Viel, Moissy-Cramayel (FR)

(73) Assignee: Safran Transmission Systems, Colombes (FR)

( * ) Notice: Subject to any disclaimer, the term of this patent is extended or adjusted under 35 U.S.C. 154(b) by 119 days.

(21) Appl. No.: 15/563,036

(22) PCT Filed: Mar. 31, 2016

(86) PCT No.: PCT/FR2016/050729
§ 371 (c)(1),
(2) Date: Sep. 29, 2017

(87) PCT Pub. No.: WO2016/156744
PCT Pub. Date: Oct. 6, 2016

(65) Prior Publication Data
US 2018/0371944 A1 Dec. 27, 2018

(30) Foreign Application Priority Data
Apr. 2, 2015 (FR) ...................................... 15 52859

(51) Int. Cl.
*F01D 25/20* (2006.01)
*F01D 9/06* (2006.01)
(Continued)

(52) U.S. Cl.
CPC ............. *F01D 25/20* (2013.01); *F01D 9/065* (2013.01); *F01D 17/16* (2013.01); *F01D 25/18* (2013.01);
(Continued)

(58) Field of Classification Search
CPC ... F02C 7/06; F01D 25/18–22; F05D 2260/98
See application file for complete search history.

(56) References Cited

U.S. PATENT DOCUMENTS

| 28,722 A | * | 6/1860 | Whitaker | F16K 17/04 137/508 |
| 280,212 A | * | 6/1883 | Miles | F04F 5/464 417/191 |

(Continued)

FOREIGN PATENT DOCUMENTS

| FR | 2 950 390 A1 | 3/2011 |
| GB | 2 079 884 A | 1/1982 |

(Continued)

*Primary Examiner* — Gerald L Sung
*Assistant Examiner* — Marc J Amar
(74) *Attorney, Agent, or Firm* — Blank Rome LLP

(57) ABSTRACT

An oil jet for a turbine engine, comprising a body including a circulation pipe intended for the flow of a pressurized fluid. The jet's body comprises a first part and a second part between which a resiliently deformable membrane is inserted, said membrane being capable of deforming between a sealed position in which it prevents the circulation of the fluid in the pipe and a position in which it allows the circulation of fluid in the pipe. The second part includes bearing means configured to exert a force on the membrane positioned in the opposite direction to the circulation of fluid so as to preload the membrane when in blocked position.

11 Claims, 1 Drawing Sheet

(51) Int. Cl.
- *F01D 17/16* (2006.01)
- *F02C 7/26* (2006.01)
- *F16K 15/14* (2006.01)
- *F16K 17/04* (2006.01)
- *F02C 7/20* (2006.01)
- *F01D 25/18* (2006.01)
- *F02C 7/06* (2006.01)

(52) U.S. Cl.
CPC .................. *F02C 7/06* (2013.01); *F02C 7/20* (2013.01); *F02C 7/26* (2013.01); *F16K 15/144* (2013.01); *F16K 15/148* (2013.01); *F16K 17/0453* (2013.01); *F05D 2260/98* (2013.01); *Y10T 137/789* (2015.04)

(56) References Cited

U.S. PATENT DOCUMENTS

| | | | | |
|---|---|---|---|---|
| 530,442 | A * | 12/1894 | Munger | F16K 17/30 137/517 |
| 2,270,333 | A * | 1/1942 | Osborn, Jr. | F16K 17/196 137/511 |
| 2,646,059 | A * | 7/1953 | Wittner et al. | E03C 1/104 137/107 |
| 2,958,376 | A | 11/1960 | Williams | |
| 3,122,156 | A * | 2/1964 | Kersh | F16K 15/148 137/218 |
| 3,764,815 | A * | 10/1973 | Habock | F01D 19/00 290/38 R |
| 3,807,445 | A | 4/1974 | McPhee | |
| 4,535,820 | A * | 8/1985 | Raines | A61M 39/24 137/854 |
| 4,762,149 | A * | 8/1988 | Pickl, Jr. | F16K 15/141 137/843 |
| 5,704,522 | A * | 1/1998 | Orgeolet | B67D 7/44 222/494 |
| 6,095,490 | A * | 8/2000 | Nakano | F02M 3/06 251/129.17 |
| 10,265,496 | B2 * | 4/2019 | Bugamelli | A61M 16/208 |
| 2006/0272637 | A1 * | 12/2006 | Johnson | A62B 9/02 128/201.27 |
| 2007/0029303 | A1 * | 2/2007 | Bowen | G01K 7/02 219/270 |
| 2009/0101853 | A1 * | 4/2009 | Migliorati | B65D 88/703 251/61.1 |
| 2016/0146359 | A1 * | 5/2016 | Ferguson | C09D 123/16 137/511 |
| 2017/0037863 | A1 * | 2/2017 | Kovach | F02M 59/44 |
| 2017/0082291 | A1 * | 3/2017 | Horikawa | F23R 3/18 |
| 2018/0045121 | A1 * | 2/2018 | Cadman | F02C 9/263 |

FOREIGN PATENT DOCUMENTS

| | | |
|---|---|---|
| GB | 2 432 406 A | 5/2007 |
| WO | WO 2006/059080 A1 | 6/2006 |

\* cited by examiner

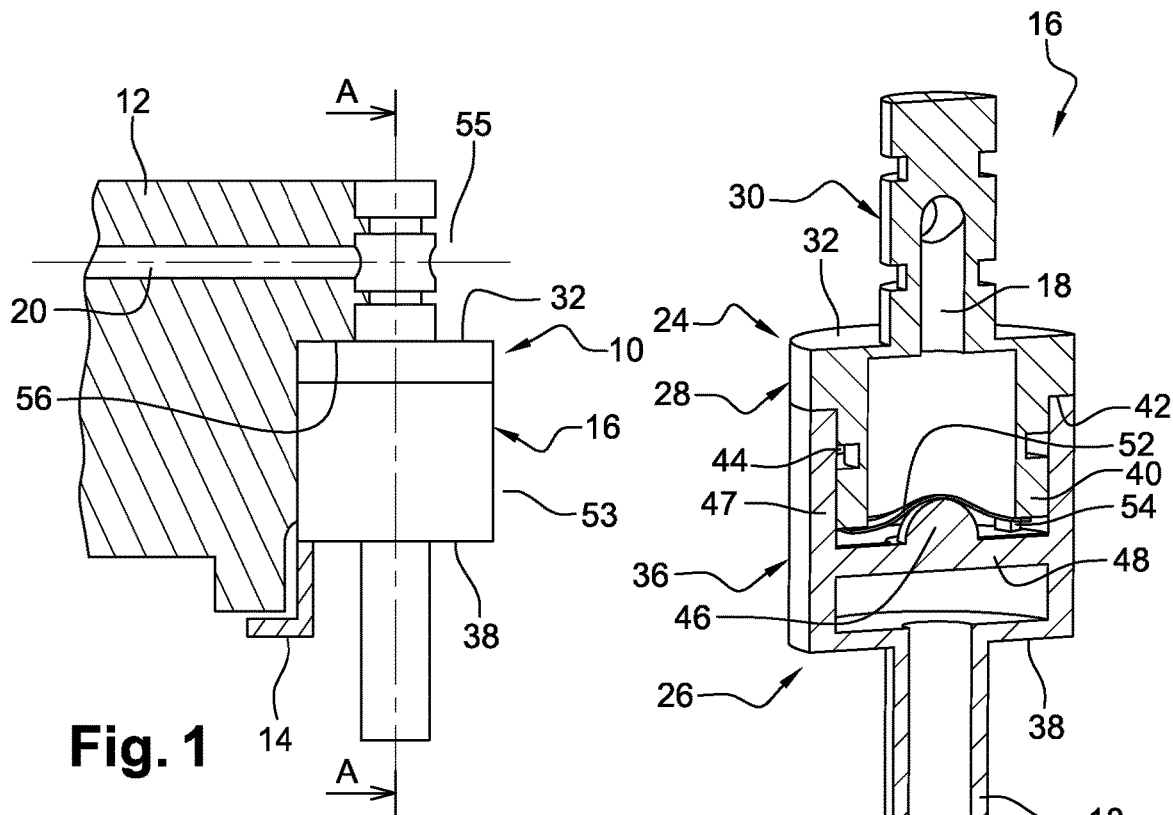
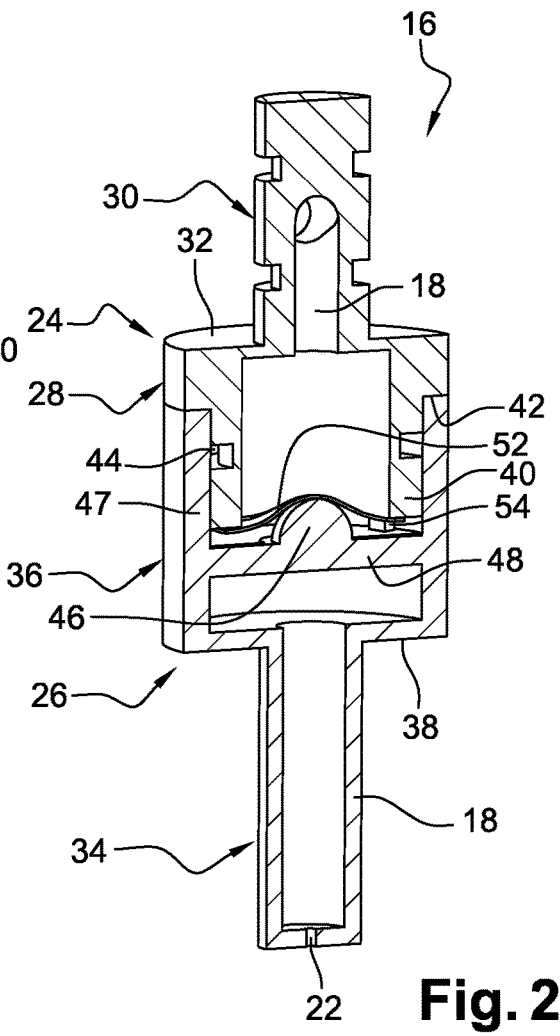
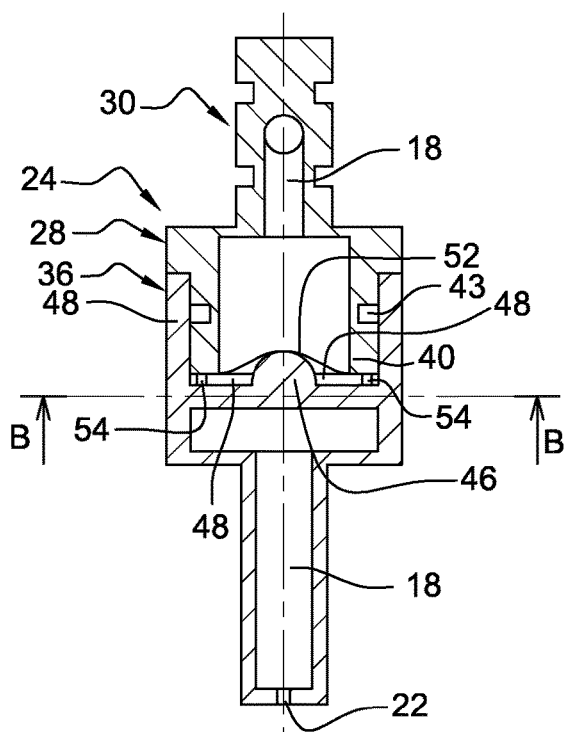
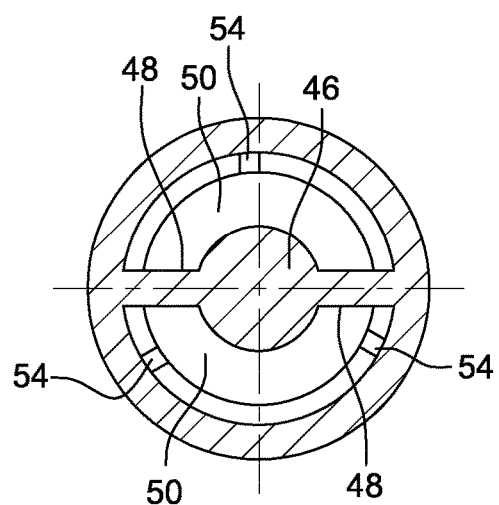
Fig. 1
Fig. 2
Fig. 3
Fig. 4

OIL JET FOR TURBINE ENGINE WITH HOUSING INCLUDING SEALING MEMBRANE

This application is a national stage of International Application No. PCT/FR2016/050729, filed on Mar. 31, 2016, which claims the benefit of French Patent Application 1552859, filed Apr. 2, 2015, the contents of each of which are incorporated herein by reference.

The present invention relates to an oil jet as well as to a turbine engine equipped with such an oil jet.

In the prior art, a turbine engine includes a plurality of oil circuits for lubricating equipment such as roller bearings or gear teeth or for cooling equipment such as electric generators. The oil circuits thus comprise oil jets that supply the various mechanical components, theses jets being arranged along the oil circuits.

When starting a turbine engine, a certain amount of time elapses before the oil reaches the equipment, which means that this equipment is not lubricated during this time. This lapse of time is all the greater as the lubricating oil circuits are long and occupy a large space.

In practice, this lapse of time corresponds to the time required to completely fill the oil circuit. In fact, during the phases when an engine is stopped, the oil circuit is emptied of its oil by gravity through the oil jets' outlet openings. Therefore, as long as the air in the oil circuit has not been eliminated, the oil pressure in the oil circuit remains at an extremely low level that does not allow the oil jets to adequately supply the equipment.

Thus, it is particularly damaging to the power transmission equipment, such as hydrodynamic bearings. In addition, the startup phase proves to be one where the transmitted torques are the highest.

The invention more particularly aims at providing a simple, efficient and cost-effective solution to this problem.

To this end, it proposes a jet, in particular an oil jet for a turbine engine, comprising a body including a circulation pipe intended for the flow of a pressurized fluid, characterised in that the body comprises a first part and a second part between which a resiliently deformable membrane is inserted, said membrane being capable of deforming between a sealed position in which it prevents the circulation of the fluid in the pipe and a position in which it allows the circulation of fluid in the pipe, the second part including bearing means configured to exert a force on the membrane positioned in a direction that is opposite to the circulation of fluid so as to preload the membrane in sealed position.

The invention thus proposes to add a membrane preventing the circulation of fluid when the pressure is lower than a value predetermined by the preload applied to the membrane through the bearing means. Thus, when the turbine engine is stopped, the membrane is in the sealed position, which blocks the circulation of fluid with the static bearing means, so that the fluid can no longer flow and is thus maintained in the jet and the pipes to which it is connected. Therefore, when the turbine engine is started, the equipment that needs the fluid can almost instantaneously be supplied since the pipes are filled with fluid, which facilitates the pressurization of the pipes.

According to another characteristic of the invention, the bearing means comprise a convex bulge resting on a central portion of the membrane.

The use of a convex bulge allows for a contact area to be established between the bulge and the membrane, which is achieved without any protruding point regardless of the bearing force on the membrane. Advantageously, with a convex bulge, the bearing surface increases gradually as the bearing force is increased.

According to one possibility of the invention, the convex bulge is connected by at least two arms, extending substantially transversely to the direction of flow of the fluid, to an inner wall of the second part so as to define at least one recess or opening for passage of fluid between the bulge and the inner wall.

More specifically, in a practical embodiment, the membrane covers a downstream end of the first part inserted into an upstream end of the second part, said downstream end of the first part including studs projecting downstream that are positioned opposite the edge of the membrane in a direction substantially perpendicular to the direction of flow of the fluid.

The projecting studs allow for the displacements of the elastic membrane to be limited in a direction perpendicular to the flow of the fluid, which would lead to a passage of fluid in the position blocking the circulation of fluid.

The jet may comprise at least three studs regularly distributed over the downstream end of the first part. In this configuration, the inner section of the oil passage of the first and second parts can be circular in shape and the membrane has a disc shape.

In practice, the membrane may be a sheet, preferably made of steel and having a thickness of less than 0.5 mm, preferably between 0.15 and 0.3 mm.

The invention also relates to an assembly comprising a casing, such as a turbine engine casing, including a housing accommodating a jet according to one of the previous claims, wherein the first part is applied against a bottom wall of the housing and clamping means are applied against the second part so as to clamp the second part against the first part.

The clamping means may comprise a nut screwed to an inner face of the housing and one end of which is applied to the second part.

Furthermore, the invention relates to a turbine engine, such as a turbojet or a turboprop, characterised in that it comprises at least one jet of the type described below or an assembly as mentioned above.

The invention will be better understood and other details, characteristics, and advantages of the invention will appear on reading the following description given by way of non-limiting example and with reference to the accompanying drawings, in which:

FIG. 1 is a schematic sectional view of an oil jet according to the invention carried by a turbine engine casing, only part of the casing being shown;

FIG. 2 is a schematic perspective view along the section plane A-A in FIG. 1;

FIG. 3 is a schematic view along the section plane A-A in FIG. 1; and

FIG. 4 is a schematic view along the section plane B-B in FIG. 3.

We first refer to FIG. 1, which shows an oil jet 10 carried by a casing 12 of a turbine engine by means of a clamping nut 14. The advantage of the clamping nut 14 in connection with the jet 10 according to the invention will appear more clearly in the remainder of the description.

The oil jet 10 includes a tubular body 16 thus housing an oil circulation pipe 18. The pipe 18 of the jet communicates with an upstream oil supply channel 20 formed in the casing 12. The oil exits through a downstream spraying orifice 22 to supply the various mechanical elements that need it (FIG. 2).

The body 16 consists of two structurally independent parts, a first part 24 being positioned above a second part 26. The first part 24 and the second part 26 are designed to be fixedly mounted with respect to each other. The pipe 18 thus extends through the first part 24 and the second part 26.

The first part 24 has a substantially tubular shape and comprises a first downstream end portion 28 and a second upstream end portion 30. The first downstream end portion 28 of the first part has an inner diameter and an outer diameter that are respectively greater than the inner diameter and outer diameter of the second upstream end portion 30 of the first part 24. A radial shoulder 32 is formed externally at the junction of the first portion 28 and the second portion 30 of the first part 24. Similarly, the second part 26 has a substantially tubular shape and comprises a first downstream end portion 34 and a second upstream end portion 36. The first downstream end portion 34 of the second part 26 has an inner diameter and an outer diameter that are respectively smaller than the inner diameter and the outer diameter of the second upstream end portion 36 of the second part 26. A radial shoulder 38 is formed externally at the junction of the first portion 34 and the second portion 36 of the second part 26.

The first portion 28 of the first part 24 includes a cylindrical wall 40 inserted into the second portion 36 of the second part 26. The first portion 28 of the first part 24 comprises a radial shoulder 42 at the upstream end of the cylindrical wall against which the free edge of the second portion 36 of the second part 26 can come to rest. A seal 43 is mounted in an outer annular groove 44 of the cylindrical wall 40 of the first portion 28 of the first part 24 (FIGS. 2 and 3).

The second portion 36 of the second part 26 includes a cylindrical wall 47 engaged around the cylindrical wall 40 of the first portion 28 of the first part 24. A convex bulge 46 is formed inside the cylindrical wall 48 so that the convex surface of the bulge is turned toward the first part 28.

This convex bulge 46 with a substantially hemispherical outer surface is connected at its base with two arms 48 extending substantially perpendicularly to the flow of fluid, these arms 48 being connected to the inner surface of the cylindrical wall 47 of the second portion 36 of the second part 26 (FIGS. 2 and 4 in particular). Two openings 50 each having the shape of a half-ring are thus delimited by the arm 48, the base of the convex bulge and the inner surface of the cylindrical wall 48.

As can be seen in FIGS. 2 and 3, an elastically deformable membrane 52 is interposed between the free end of the cylindrical wall 40 of the first part 24 and the convex bulge 46 so that the convex bulge 46 comes to rest substantially on a central portion of the membrane 52. The elastic membrane 52 completely covers the free end of the first portion 28 of the first part 24. This free end comprises several studs 54 projecting downstream and arranged opposite the edge of the membrane 52 in the direction perpendicular to the oil flow, so as to limit the membrane's 52 displacement in the transverse direction (FIGS. 3 and 4).

FIG. 2 thus shows the membrane in a position blocking or sealing the circulation of oil in the direction of the oil spraying orifice 22. It will thus be understood that the degree of insertion of the first part 24 into the second part 26 allows for controlling the membrane's 52 level of deformation and therefore the level of preload applied to the membrane 52. When the oil pressure is greater than the preload applied by the convex bulge 46, the membrane 52 deforms elastically and the oil flows through the openings 50 to the outlet orifice 22 of the jet. The convex bulge 46 thus forms static bearing means on the membrane.

As shown in FIG. 1, the jet is mounted in a cavity of the casing. This cavity comprises a first housing 53 and a second housing 55 which are cylindrical. The first housing 53 has a larger diameter than the second housing 55. The second portion 30 of the first part 24 of the jet is engaged in the second housing 55. The first portion 28 of the first part 24 of the jet 10 and the second portion 36 of the second part 26 of the jet 10 are mounted in the first housing 53 so that the shoulder 32 of the first part 24 of the jet's 10 body 16 comes into contact with a shoulder 56 of the casing formed at the junction of the first 53 and second 55 housings. A clamping nut 14 is screwed onto the inner face of the first housing 53 at the end opposite the second housing 55 and is applied against the shoulder 38 of the second part 26 of the jet's 10 body 16 in order to block the second part 26. In practice, the preload is determined by the dimensioning of the first 24 and second 26 parts of the jet.

The invention helps limit oil losses in the oil circuit, which occur by gravity when the turbine engine is stopped, by blocking the circulation of oil. The pressurization of the circuit is greatly facilitated and lubricating oil can thus be quickly supplied to the various mechanical elements that need it.

If the description given with reference to the figures relates to a convex bulge, it is understood that it would be possible to use other bearing means to ensure the preloading of the elastically deformable membrane in order to block the flow of oil when the turbine engine is stopped.

The term "casing" refers to both a casing supporting the bearing housings of a low-pressure rotor or of a high-pressure rotor of the turbine engine and a casing of an accessory gearbox supporting equipment. Such an accessory gearbox is usually arranged in the nacelle of the turbine engine.

The terms "upstream" and "downstream" are used herein with respect to the direction of flow of the fluid in the oil jet.

The invention claimed is:

1. An oil jet for a turbine engine, the oil jet comprising: a body including a circulation pipe for a flow of a pressurized fluid, wherein the body includes a first part and a second part between which a resiliently deformable membrane is inserted, wherein the deformable membrane deforms between a sealed position in which it prevents circulation of the fluid in the circulation pipe and a position in which it allows circulation of fluid in the circulation pipe, the second part including bearing means configured to exert a force on the deformable membrane positioned in a direction that is opposite to the circulation of fluid so as to preload the deformable membrane in the sealed position, said bearing means comprising a convex bulge resting on a central portion of the deformable membrane, the convex bulge having a substantially hemispherical outer surface.

2. The oil jet of claim 1, wherein the convex bulge is connected by at least two arms, extending substantially transversely to a direction of flow of the fluid, to an inner wall of the second part so as to define at least one recess for passage of the fluid between the convex bulge and the inner wall.

3. The oil jet of claim 2, wherein the deformable membrane covers a downstream end of the first part, the downstream end of the first part being inserted into an upstream end of the second part, said downstream end of the first part including studs projecting downstream that are positioned opposite an edge of the deformable membrane in a direction substantially perpendicular to the direction of flow of the fluid.

4. The oil jet of claim 3, further comprising at least three studs distributed over the downstream end of the first part.

5. The oil jet of claim 1, wherein the deformable membrane is a sheet.

6. An assembly comprising a turbine engine casing, including a housing accommodating the oil jet according to claim 1, wherein the first part is applied against a bottom wall of the housing and a clamping nut is applied against the second part so as to clamp the second part against the first part.

7. The assembly of claim 6, wherein the clamping nut is screwed to an inner face of the housing and one end of which is applied to the second part.

8. A turbine engine comprising at least one oil jet according to claim 1.

9. The oil jet of claim 5, wherein the deformable membrane is a steel sheet having a thickness of less than 0.5 mm.

10. The oil jet of claim 9, wherein the steel sheet has a thickness between 0.15 and 0.3 mm.

11. A turbine engine comprising the assembly of claim 6.

* * * * *